US010032277B2

(12) United States Patent
Ratcliff et al.

(10) Patent No.: US 10,032,277 B2
(45) Date of Patent: Jul. 24, 2018

(54) METHOD, APPARATUS, AND SYSTEM FOR DISPLAYING A GRAPHICAL USER INTERFACE

(71) Applicant: INTEL CORPORATION, Santa Clara, CA (US)

(72) Inventors: Joshua J. Ratcliff, Santa Clara, CA (US); Giuseppe Beppe Raffa, Portland, OR (US); Alexandra Zafiroglu, Portland, OR (US); Stanley Mo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,656

(22) PCT Filed: Sep. 18, 2013

(86) PCT No.: PCT/US2013/060344
§ 371 (c)(1),
(2) Date: Dec. 27, 2013

(87) PCT Pub. No.: WO2015/041642
PCT Pub. Date: Mar. 26, 2015

(65) Prior Publication Data
US 2016/0210752 A1 Jul. 21, 2016

(51) Int. Cl.
G06T 7/00 (2017.01)
G09G 5/02 (2006.01)
(Continued)

(52) U.S. Cl.
CPC ............ G06T 7/0042 (2013.01); G06F 1/163 (2013.01); G06F 3/012 (2013.01); G06F 3/013 (2013.01);
(Continued)

(58) Field of Classification Search
None
See application file for complete search history.

(56) References Cited

U.S. PATENT DOCUMENTS

2002/0057280 A1   5/2002  Anabuki et al.
2006/0164409 A1*  7/2006  Borchardt ........... G06F 3/04815
                                                                     345/419
(Continued)

FOREIGN PATENT DOCUMENTS

WO    2012/003844 A1    1/2012

OTHER PUBLICATIONS

"Wearable brain sensor helps workers multitask", downloaded from www.smartplanet.com/blog/smart-takes/wearable-brain-sensor-helps-workers-multitask/26566, retrieved Jun. 28, 2012.
(Continued)

Primary Examiner — James A Thompson
(74) Attorney, Agent, or Firm — Barnes & Thornburg LLP

(57) ABSTRACT

Technologies for displaying graphical elements on a graphical user interface include a wearable computing device to generate a captured image. The wearable computing device analyzes the captured image to generate image location metric data for one or more prospective locations on the graphical user interface at which to place a graphical element. The image location metric data indicates one or more image characteristics of the corresponding prospective location. The wearable computing device determines appropriateness data for each prospective location based on the corresponding image location metric data. The appropriate data indicates a relative suitability of the corresponding location for display of the graphical element. The wearable computing device selects one of the prospective locations based on the appropriateness data and displays the graphical
(Continued)

element on the graphical user interface at the selected prospective location.

23 Claims, 7 Drawing Sheets

(51) Int. Cl.
G09G 5/14 (2006.01)
G06F 1/16 (2006.01)
G06F 3/01 (2006.01)
G06F 3/0481 (2013.01)
G06F 3/16 (2006.01)
G06T 7/73 (2017.01)
G06T 7/50 (2017.01)
G06T 7/90 (2017.01)

(52) U.S. Cl.
CPC ............ G06F 3/015 (2013.01); G06F 3/0481 (2013.01); G06F 3/04815 (2013.01); G06F 3/16 (2013.01); G06T 7/50 (2017.01); G06T 7/73 (2017.01); G06T 7/90 (2017.01); G09G 5/026 (2013.01); G09G 5/14 (2013.01); G06T 2207/10024 (2013.01); G06T 2207/20 (2013.01); G06T 2207/20021 (2013.01); G06T 2207/30201 (2013.01); G09G 2354/00 (2013.01)

(56) References Cited

U.S. PATENT DOCUMENTS

| | | | |
|---|---|---|---|
| 2010/0238161 A1* | 9/2010 | Varga | G06T 17/05 345/419 |
| 2011/0249122 A1 | 10/2011 | Tricoukes | |
| 2012/0062445 A1 | 4/2012 | Haddick | |
| 2013/0007668 A1 | 1/2013 | Liu | |
| 2013/0128364 A1 | 5/2013 | Wheeler | |
| 2013/0135353 A1 | 5/2013 | Wheeler | |
| 2013/0194164 A1* | 8/2013 | Sugden | G02B 27/017 345/8 |
| 2013/0257709 A1* | 10/2013 | Raffle | G06F 3/017 345/156 |
| 2015/0227795 A1* | 8/2015 | Starner | G06K 9/00671 345/156 |

OTHER PUBLICATIONS

"High-dynamic-range imaging", downloaded from http://en.wikipedia.org/wiki/High-dynamic-range_imaging, retrieved Jul. 9, 2013.
Kadir et al., "Saliency, Scale and Image Description", University of Oxford, Nov. 2000, 45 pages.
International Search Report for PCT/US13/060344, dated Jun. 20, 2014 (3 pages).
Written Opinion for PCT/US13/060344, dated Jun. 20, 2014 (4 pages).
European Search Report for Patent Application No. 13900877.5-1972/3047361, dated Mar. 14, 2017, 9 pages.
Bell, Blaine, et al. "View Management for Virtual and Augmented Reality," UIST 2001, ACM Symp. on User Interface Software and Technology, Orlando, Florida, Nov. 11-14, 2001, pp. 101-110.
Peterson, Stephen D., et al., "Visual Clutter Management in Augmented Reality: Effects of Three Label Separation Methods on Spatial Judgments," IEEE Symposium on 3D User Interfaces, Mar. 14-15, 2009, Lafayette, Louisiana, USA, 8 pages.
Grasset, Raphael, et al., "Image-Driven View Management for Augmented Reality Browsers," IEEE International Symposium on Mixed and Augmented Reality 2012 Science and Technology Proceedings, Nov. 5-8, 2012, Atlanta, Georgia, 10 pages.

* cited by examiner

METHOD, APPARATUS, AND SYSTEM FOR DISPLAYING A GRAPHICAL USER INTERFACE

CROSS REFERENCE TO RELATED APPLICATIONS

This application is a national stage entry under 35 USC § 371(b) of International Application No. PCT/US2013/060344, which was filed Sep. 18, 2013.

BACKGROUND

Head-mounted displays and other wearable displays have emerged in conjunction with wearable computing devices. Head-mounted and certain other wearable displays create the illusion of an image floating in free space in front of the user through projection of a visual user interface onto, for example, a transparent surface mounted on a pair of eyeglasses. The projected visual interface is also typically transparent so that the interface does not block out existing light behind it. Accordingly, the projected visual interface appears to be overlain or otherwise viewed "on top of" the user's field of view. The visual user interface is generally always projected to the same portion of the display.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
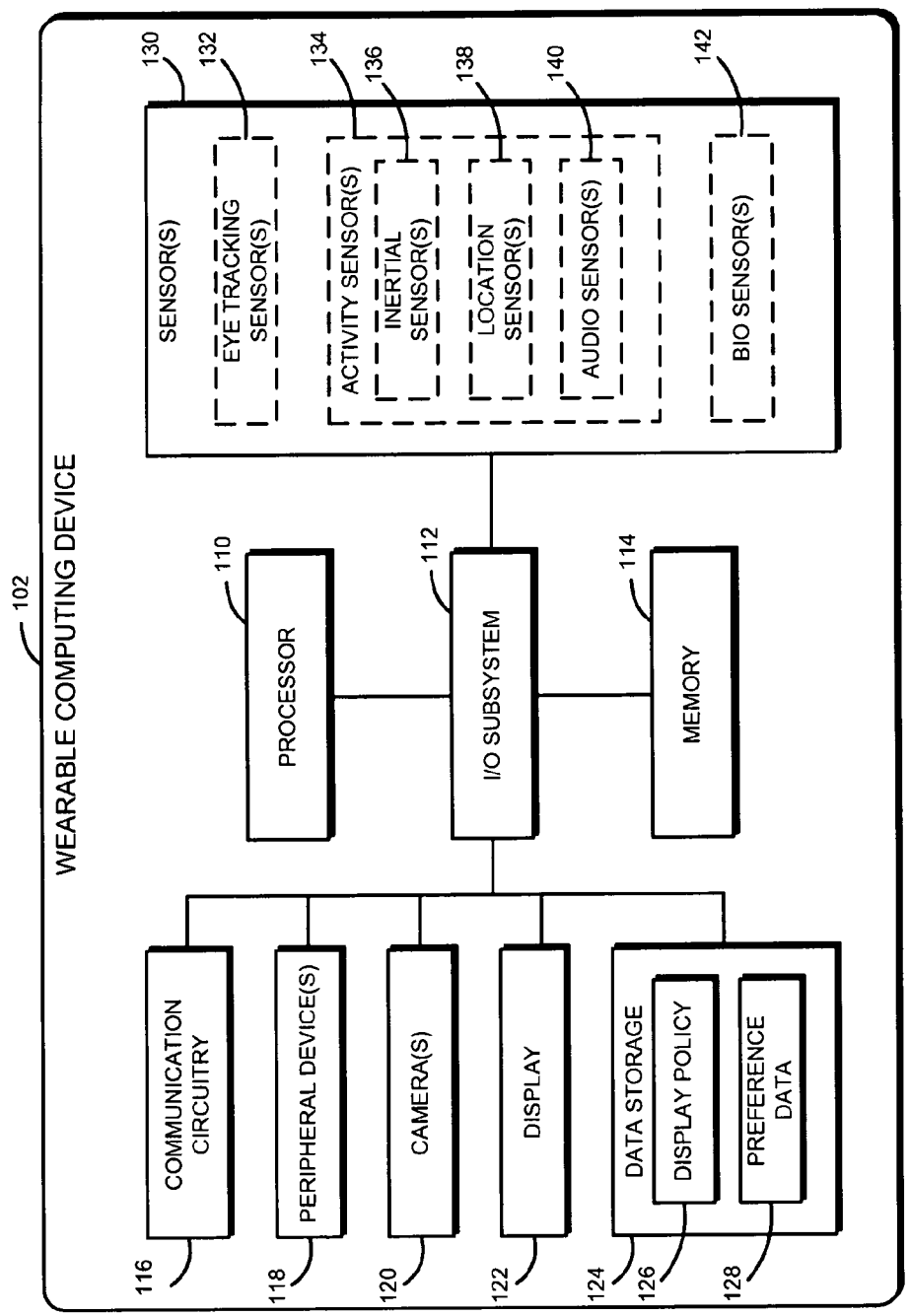
FIG. 1 is a simplified block diagram of at least one embodiment of a wearable computing device for displaying a graphical user interface.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a wearable computing device 102 is configured to display graphical elements on a graphical user interface of a head-mounted display. The graphical elements may be embodied as text, images, and/or other visual elements. As discussed in detail below, the wearable computing device 102 captures one or more images including the field of view of the user and analyzes the captured image and context data to determine an appropriate display location for graphical elements on the graphical user interface.

The wearable computing device 102 may be embodied as any type of mobile computing device including a head-mounted display and capable of being worn by a user, and performing the various functions described herein. For example, the wearable computing device 102 may be embodied as, or otherwise include, any type of head-mounted display (e.g., computer eyewear) or other wearable computing device capable of projecting a graphical user interface such that it is merged with or overlain on the user's field of view. As shown in FIG. 1, the illustrative wearable computing device 102 includes a processor 110, an input/output ("I/O") subsystem 112, a memory 114, a communication circuitry 116, one or more peripheral devices 118, one or more cameras 120, a display 122, a data storage 124, and one or more sensors 130. Of course, the wearable computing device 102 may include other or additional components, such as those commonly found in a typical mobile computing device (e.g., various input/output devices), in other embodiments. Additionally, in some embodiments, one or more of the illustrative components may be incorporated in, or otherwise from a portion of, another component. For example, the memory 114, or portions thereof, may be incorporated in the processor 110 in some embodiments.

The processor 110 may be embodied as any type of processor capable of performing the functions described herein. For example, the processor may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the wearable computing device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the wearable computing device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the wearable computing device 102, on a single integrated circuit chip.

The communication circuitry 116 may be embodied as any communication circuit, device, or collection thereof, capable of enabling communications between the wearable computing device 102 and other remote devices over a network (not shown). To do so, the communication circuitry 116 may use any suitable communication technology (e.g., wireless or wired communications) and associated protocol (e.g., Ethernet, Bluetooth®, Wi-Fi®, WiMAX, etc.) to effect such communication depending on, for example, the type of network, which may be embodied as any type of communication network capable of facilitating communication between the wearable computing device 102 and remote devices. The peripheral devices 118 of the wearable computing device 102 may include any number of additional peripheral or interface devices. The particular devices included in the peripheral devices 118 may depend on, for example, the type and/or intended use of the wearable computing device 102.

The camera(s) 120 may be embodied as any peripheral or integrated device suitable for capturing images, such as a still camera, a video camera, or other device capable of capturing video and/or images. The wearable computing device 102 may include multiple cameras 120 in some embodiments, which may be used to capture images, for example, from different perspectives. Alternatively or additionally, one or more of the cameras 120 may be a three-dimensional (3D) camera, depth camera, bifocal camera, and/or be otherwise capable of generating a depth image, channel, or stream. For example, one or more of the cameras 120 may include an infrared (IR) projector and an IR sensor such that the IR sensor estimates depth values of objects in the scene by analyzing the IR light pattern projected on the scene by the IR projector. In another embodiment, one or more of the cameras 120 include at least two lenses and corresponding sensors configured to capture images from at least two different viewpoints of a scene (e.g., a stereo camera).

In some embodiments, one or more of the cameras 120 is capable of changing the exposure level of the particular camera 120, generating high dynamic range (HDR) images, and/or determining the light intensity levels of captured images. In the illustrative embodiment, the cameras 120 are configured to capture images including the scenery within a field of view of a user of the wearable computing device 102. In other words, the cameras 120 may capture images of whatever the user can see. Accordingly, the camera 120 may be positioned or mounted in a manner to permit the capture of the user's field of view. As discussed below, the captured images are analyzed based on various analytic metrics to determine an appropriate location for displaying a graphical element.

The display 122 of the wearable computing device 102 may be embodied as any one or more display screens on which information may be displayed to a viewer of the wearable computing device 102. The display 122 may be embodied as, or otherwise use, any suitable display technology for doing so. In the illustrative embodiment, the display 122 is embodied as a projection camera and associated transparent projection surface mounted on a pair of eyeglasses. In other embodiments, the display 122 may be embodied as some other combination of a projector and corresponding projection surface. For example, in some embodiments, the graphical user interface may be projected directly into the user's eye. Although only a single display 122 is illustrated in FIG. 1, it should be appreciated that the wearable computing device 102 may include multiple displays or display screens on which the same or different content may be displayed contemporaneously or sequentially with each other. For example, the same graphical user interface may be projected into each eye of the user.

The data storage 124 may be embodied as any type of device or devices configured for short-term or long-term storage of data such as, for example, memory devices and circuits, memory cards, hard disk drives, solid-state drives, or other data storage devices. As shown in the illustrative embodiment, the data storage 124 includes a display policy 126 and preference data 128. As discussed below, the user of the wearable computing device 102 may establish preferences regarding the display of graphical elements on the graphical user interface. For example, the wearable computing device 102 may be equipped with an explicit or implicit feedback mechanism (e.g., responsive to audio inputs or other inputs) to store user preferences. Additionally, the wearable computing device 102 may establish a display policy 126, preference data 128, and/or a profile based on, for example, historical behaviors of the user and/or historical display location characteristics for graphical elements. In some embodiments, the display policy 126 includes data regarding the parameters of the wearable computing device 102 (e.g., the dimensions of the available display region for the graphical user interface).

The sensors 130 collect data regarding a user of the wearable computing device 102, the environment of the wearable computing device 102, the wearable computing device 102 itself, and/or other data to be used in the determination of the context of the user and a location at which to position the graphical elements of the graphical user interface. As shown in the illustrative embodiment, the sensors 130 may include eye tracking sensors 132, activity sensors 134, and/or biological sensors 142. As discussed below, the eye tracking sensors 132 may sense data that may be used by the wearable computing device 102 to determine a user's gaze angle and distance based on, for example, glints and/or other light reflections from the user's eyes. Additionally, the activity sensors 134 may include inertial sensors 136, location sensors 138, audio sensors 140 and/or other sensors configured to sense data indicative of activity of the user. The inertial sensors 136 (e.g., accelerometers and gyroscopes) and/or location sensors 138 (e.g., global positioning systems) may be used, for example, to determine motion of the user. Further, the audio sensors 140 (e.g., microphones) may be used to determine the audio engagement of the user (e.g., the extent to which the user is engaged in a conversation and/or the user's proximity to people). As discussed below, the biological sensors 142 may be used to determine various biological states of the user. For example, the biological sensors 142 may sense brain activity of the user (e.g., via functional near-infrared spectroscopy and/or electroencephalography), temperature, moisture, or other biological characteristics of the user. In various embodiments, the sensors 130 may be embodied as, or otherwise include, for example, proximity sensors, optical sensors, light sensors, audio sensors, temperature sensors, motion sensors, piezoelectric sensors, and/or other types of sensors. Of course, the wearable computing device 102 may also include components and/or devices configured to facilitate the use of the sensor(s) 130. It should be appreciated that the sensors 130 may be located on the wearable computing device 102 or elsewhere on the user (e.g., embedded in the user's clothes).

Figure 2:
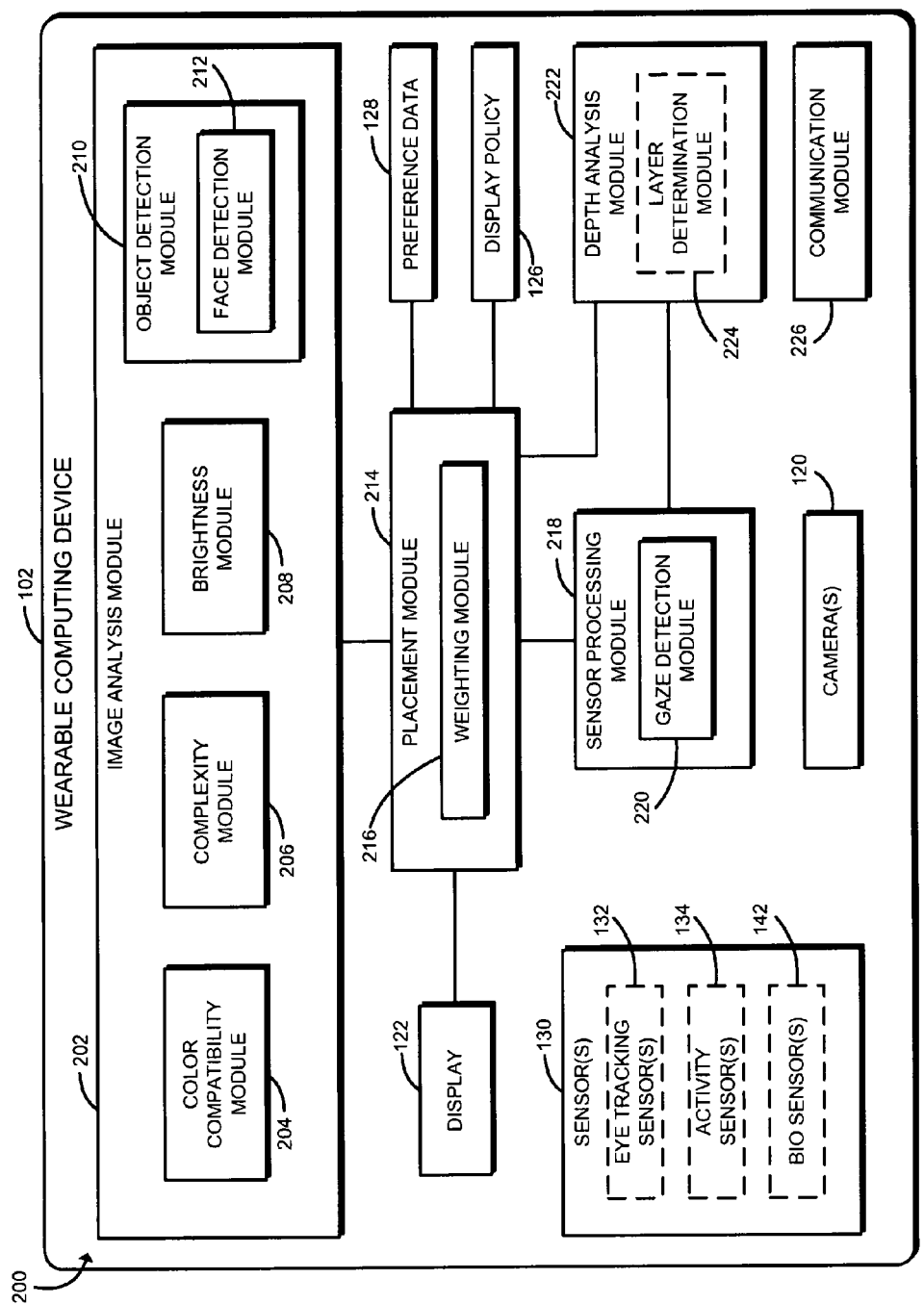
FIG. 2 is a simplified block diagram of at least one embodiment of an environment of the wearable computing device of FIG. 1.

Referring now to FIG. 2, in use, the wearable computing device 102 establishes an environment 200 for displaying graphical elements on a graphical user interface of a head-mounted display. As discussed below, the wearable computing device 102 may determine appropriate locations for the placement of graphical elements on the graphical user interface based on image analysis, context data, user preferences, a display profile, and/or other parameters or characteristics. For example, the wearable computing device 102 may determine not to place a graphical element "over" an area of the scene that is complex, too bright, the same color as the graphical element, or otherwise inappropriate for its placement.

The illustrative environment 200 of the wearable computing device 102 includes an image analysis module 202, a placement module 214, a sensor processing module 218, a depth analysis module 222, a communication module 226, the camera 120, the display 122, the sensors 130, 132, 134, 142, the display policy 126, and the preference data 128. As shown in the illustrative embodiment, the image analysis module 202 includes a color compatibility module 204, a complexity module 206, a brightness module 208, and an object detection module 210 (which includes a face detection module 212). Additionally, the placement module 214 includes a weighting module 216, and the sensor processing module 218 includes a gaze detection module 220. Additionally, in some embodiments, the depth analysis module 222 may include a layer determination module 224. Each of the image analysis module 202, the color compatibility module 204, the complexity module 206, the brightness module 208, the object detection module 210, the face detection module 212, the placement module 214, the weighting module 216, the sensor processing module 218, the gaze detection module 220, the depth analysis module 222, the layer determination module 224, and the communication module 226 may be embodied as hardware, software, firmware, or a combination thereof. Additionally, in some embodiments, one of the illustrative modules may form a portion of another module (e.g., the image analysis module 202 and/or the depth analysis module 222 may form a portion of the placement module 214).

The image analysis module 202 receives the images captured with the camera 120 (e.g., captured as streamed video, as a collection of images/frames, or in another format). In the illustrative embodiment, the camera 120 captures images including the scene in the field of view of the user of the wearable computing device 102. As discussed in more detail below, the image analysis module 202 analyzes each of the images (e.g., each frame of a streamed video or a subset thereof) to determine various characteristics and/or parameters of the image using various analytical metrics. The particular analytic metrics used may vary by embodiment but may include the use of image filters, image analysis algorithms, and other techniques and mechanisms for determining characteristics of the captured image or a portion thereof. For example, in some embodiments, one or more of the metrics or filters may use a windowing method to analyze a portion of the captured image at a time and may "scan" the window across one or more prospective locations for a graphical element (e.g., all prospective locations). The window size may vary depending on the particular embodiment but, in some embodiments, may be the same size and/or shape as the graphical element to be placed. Further, what the analytic or metric constitutes as "appropriate" may vary from embodiment to embodiment. For example, the image analysis module 202 may determine the brightness or light intensity of an image to be a more significant attribute for a user sensitive to light than typical users. Such information may be stored as user preference data 128 and/or in the display policy 126.

The color compatibility module 204 analyzes the captured images to extract or otherwise determine characteristics related to the color of the captured image(s). More specifically, the captured image is analyzed in conjunction with one or more prospective graphical elements to determine whether the color of the graphical elements are compatible with various locations of the image. For example, it may be inappropriate to place a red graphical element (e.g., red text) over a red portion of the image (e.g., a red wall). In some embodiments, the color compatibility module 204 generates a reference histogram or other representation of frequencies of light present in pixels of the graphical element to be placed. Additionally, the color compatibility module 204 generates histograms or other representations for one or more prospective locations at which to place to graphical element and compares them to the reference histogram or representation. The color compatibility module 204 may generate metric data associated with each of the compared locations, which may be used by the placement module 214 to determine an appropriate location based on, for example, color contrast. In some embodiments, the color compatibility module 204 utilizes some threshold value for an appropriate amount of contrast between two colors to determine the appropriateness of a particular location. In other embodiments, the color compatibility module 204 may use another suitable mechanism for comparing the colors present in the captured image to a graphical element to be displayed.

The complexity module 206 analyzes the captured images to determine the complexity of various regions of the images. The complexity of the various regions may be determined using any suitable measurement methodology. For example, the complexity module 206 may generate an entropy score or other metric data for each prospective location of the graphical element. The score or data may indicate, for example, the extent to which the image at the prospective location (e.g., within a filter window) is "busy" or otherwise complex. In doing so, the complexity module 206 may employ an entropy-determining algorithm, a saliency algorithm, or another suitable algorithm to determine the level of detail in the image regions. In some embodiments, the complexity module 206 may determine a location having relatively low entropy (e.g., a wall or floor) to be a more appropriate location for the graphical element than a location having high entropy (e.g., table and chair legs). In some embodiments, the complexity module 206 may also determine an appropriate transparency level based on the complexity of the relevant image locations. For example, it may be appropriate to display a less transparent graphical element over a high-entropy region than a more transparent graphical element.

The brightness module 208 analyzes the captured images to determine the absolute or relative brightness of prospective locations of the images. As discussed above, in some embodiments, one or more of the cameras 120 is capable of generating an HDR image or otherwise able to determine the levels of light intensity in the images. The brightness module 208 analyzes those intensity levels at prospective image locations to generate or determine metric data related to the light intensity. It should be appreciated that, although a graphical element may be otherwise suitably positioned at a particular location, the intensity of light at that particular location may render the location inappropriate for placement. For example, while it may ordinarily be appropriate to place a black graphical element on a white background, if the white background is the sky, it may not be appropriate as such placement may require the user to look toward the sun to see the graphical element.

The object detection module 210 analyzes the captured image to determine the location of particular objects, if any, in the image and may utilize any suitable object detection/tracking algorithm for doing so. For example, the object detection module 210 may utilize edge detection filters and/or algorithms to identify the boundaries of the objects in the image. For example, the object detection module 210 may utilize image gradient operator(s) (e.g., Sobel filters), Canny edge detection, and/or other edge detection algorithms. In some embodiments, the object detection module 210 may additionally, or alternatively, utilize one or more suitable image segmentation algorithms for identifying the objects in the scene (e.g., pyramid segmentation or watershed algorithms). The object detection module 210 may generate metric data indicating the locations of the detected objects such that the placement module 214 may consider those locations in determining where to place the graphical element for display.

The objects of interest may vary depending on the particular embodiment and may be stored, for example, in the display policy 126 and/or preference data 128. For example, in the illustrative embodiment, the object detection module 210 detects the location of any persons' faces in the captured image. As such, the face detection module 212 is configured to analyze the captured image to detect the existence of one or more persons' faces in an image and determine the location of any detected faces in the captured image. Further, in some embodiments, the face detection module 212 may identify a person based on their detected face (e.g., through biometric algorithms and/or other face recognition or object correlation algorithms). As such, in embodiments in which multiple persons are tracked, the face detection module 212 may distinguish between those persons in the captured images. In that vein, the display policy 126 and/or the preference data 128 may identify particular persons or categories/groups/classes of persons over which a graphical element should preferably not be displayed (e.g., one's physician). In doing so, the face detection module 212 may employ a feature extraction algorithm to identify facial landmarks, edges, and/or corners.

The sensor processing module 218 receives sensor data from the sensors 130, 132, 134, 142 and processes the received sensor data (e.g., to determine its relevance) to generate context data for the user and/or the wearable computing device 102. For example, the sensor processing module 218 may determine a rate of speed at which the user is moving, if at all, based on the inputs from the activity sensors 134 (e.g., the inertial sensors 136 and/or the location sensors 138). In some embodiments, the context data includes the sensor data itself, and in other embodiments, the context data includes derived information based on the sensor data. In the illustrative embodiment, the sensor processing module 218 includes the gaze detection module 220, which analyzes sensor data received from the eye tracking sensors 132 to determine the direction and/or angle of the user's gaze. As such, the gaze detection module 220 may determine a point or location corresponding to a location in the captured image at which the user is focused. For example, the gaze detection module 220 may determine that the user is looking at a particular object or person, and such information may be used in the determination of an appropriate location at which to display the graphical element(s) as discussed in more detail below. It should be appreciated that, in other embodiments, the sensor processing module 218 may analyze different contextual information (e.g., from different sensors 130) and thereby generate different context data from that discussed herein.

The depth analysis module 222 analyzes the captured images (e.g., the depth channel or stream) to determine the distance of various objects from the camera 120. For example, the depth analysis module 222 may analyze the depth channel, alone or in combination with color channels (e.g., red-green-blue), to identify the foreground and background portions of the captured image and generate associated metric data for various locations of the image. In doing so, the depth analysis module 222 may utilize any suitable algorithm, technique, or mechanism (e.g., edge detection and flood-filling algorithms). In some embodiments, the depth analysis module 222 may generate a depth map of the captured image and/or warp the captured image (e.g., via projection) to match the user's first-person perspective of the scene. As shown in the illustrative embodiment, the depth analysis module 222 may include the layer determination module 224. The layer determination module 224 identifies the layer (e.g., foreground or background portion) of the captured image at which the user's eyes are focused. In doing so, the layer determination module 224 may utilize the context data generated by the gaze detection module 220 discussed above.

The communication module 226 handles the communication between the wearable computing device 102 and remote devices (e.g., remote sensors and/or other wearable computing devices) through a network (not shown). As such, the communication module 226 may receive data (e.g., sensor data or context data) from another computing device in the vicinity of the wearable computing device 102. For example, in some embodiments, wearable computing devices 102 within the same room may share context data with one another, thereby enabling each of the wearable computing devices 102 to more accurately determine both the context of itself and its user and also determine more global contextual information associated with the environment.

In the illustrative embodiment, the placement module 214 receives metric data from the image analysis module 202 and the depth analysis module 222, context data from the sensor processing module 218, and incoming data from the communication module 226. The placement module 214 analyzes the received information to determine the appropriateness of placing a graphical element in one or more prospective locations on the graphical user interface of the display 122. In doing so, the placement module 214 may generate appropriateness data for each prospective location indicative of the relative suitability of the corresponding prospective location. It should be appreciated that the placement module 214 may utilize any suitable algorithm, technique, or mechanism for determining the appropriateness of a prospective location and generating the appropriateness data.

For example, in the illustrative embodiment, the placement module 214 includes the weighting module 216, which assigns weights (e.g., scalar coefficients) to each of the analytical and contextual metrics and corresponding metric and contextual data, and the weighting module 216 combines the weighted data in a suitable way. For example, the weighting module 216 may generate a weighted sum of the analytic and contextual metrics for each prospective location and select the prospective location having the highest sum (i.e., assuming a higher value corresponds with a more appropriate image location). In some embodiments, the weighting module 216 may normalize the metric data prior to combining it (e.g., taking a weighted sum). Of course, in other embodiments, the placement module 214 may generate a composite value or score for the appropriateness of a particular location based on the analytical and/or contextual metrics using any other suitable algorithm or technique. Further, the placement module 214 may include data/values corresponding to the preference data 128 and/or the display policy 126 in the composite score. In some embodiments, the placement module 214 may warp the graphical element (e.g., via projection) to place the element on a surface in the same perspective in which the user sees the surface (e.g., along a wall). It should further be appreciated that the placement module 214 may modify the graphical element to be placed based on the received data and may determine whether to place/move a graphical element according to a predefined interval or period (e.g., defined in the display policy 126).

Figure 3:
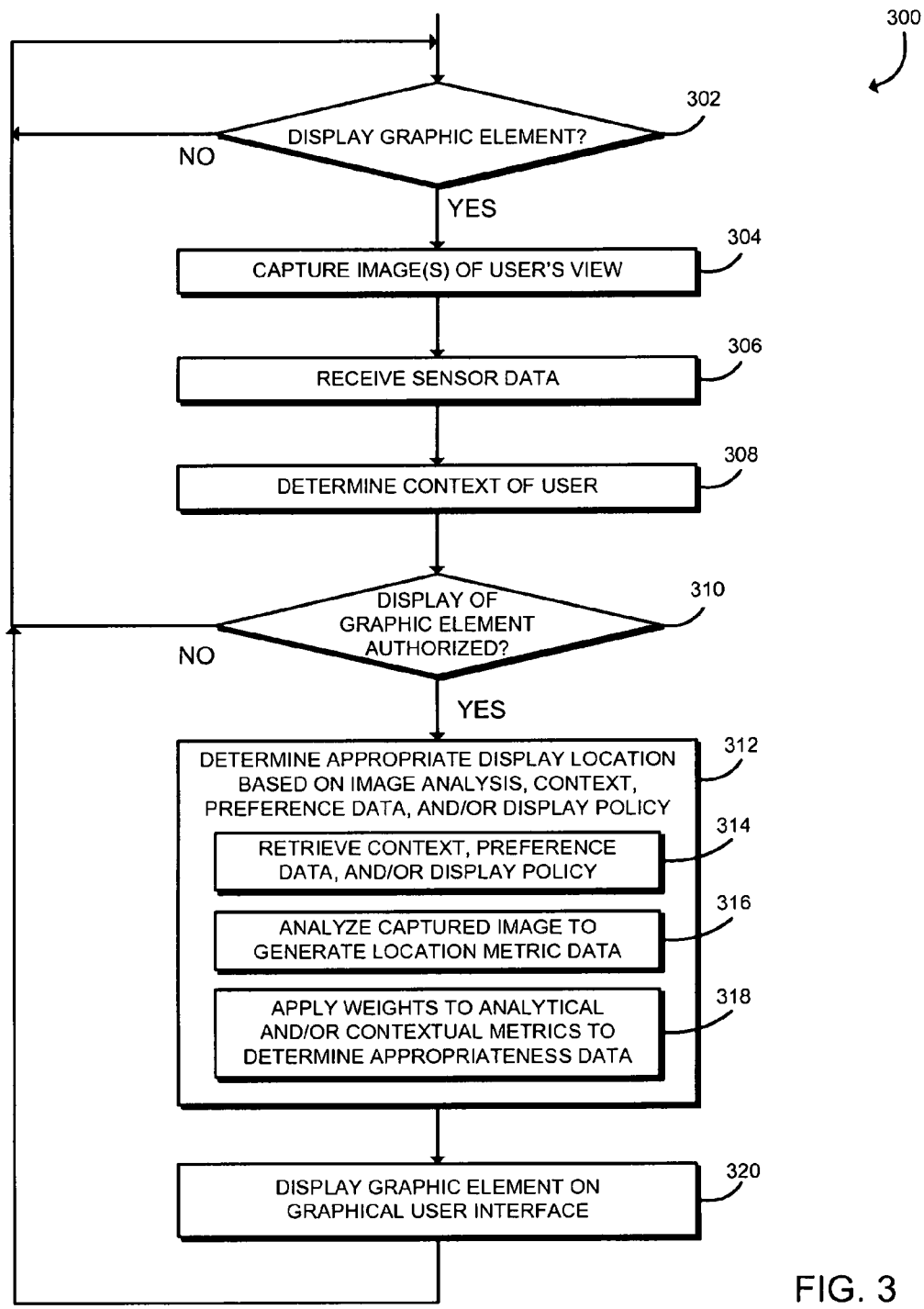
FIG. 3 is a simplified flow diagram of at least one embodiment of a method for displaying a graphical user interface by the wearable computing device of FIG. 1.

Referring now to FIG. 3, in use, the wearable computing device 102 may execute a method 300 for displaying graphical elements on a graphical user interface of a wearable computing device 102. The illustrative method 300 begins with block 302 in which the wearable computing device 102 determines whether to display a graphical element on a graphical user interface and, therefore, on the display 122. If so, in block 304, the wearable computing device 102 captures one or more images of the user's field of view with the camera(s) 120. As discussed above, in some embodiments, the wearable computing device 102 may utilize multiple cameras 120 to capture the user's full field of view and/or to capture the image from different angles (e.g., to determine depth). In block 306, the wearable computing device 102 receives sensor data from conversation. In block 416, the wearable computing device 102 determines the language processing load of the user using any suitable sensor data and algorithms. That is, the wearable computing device 102 determines the difficulty and/or level of focus associated with the user's processing of the natural language audio. Of course, the natural language load, and acceptable threshold level, may vary depending on the particular conversation and the particular user.

In block 418, the wearable computing device 102 determines the biological state of the user based on the biological sensors 142 and generates any relevant context data. For example, as discussed above, the wearable computing device 102 may analyze the user's brain activity, temperature, moisture, and/or other biological characteristics or symptoms of the user. Based on such an analysis, the wearable computing device 102 may determine, for example, whether it is safe to display a graphical element or any portion of the graphical user interface. For example, it may be unsafe to display the graphical user interface if the user is in deep concentration, out of focus, or in cognitive overload. In another embodiment, the wearable computing device 102 may sense or determine anxiety or discomfort associated with displaying a graphical element in a particular location.

Referring back to FIG. 3, the wearable computing device 102 determines whether display of the graphical element is authorized in block 310. Such authorization may be based on the preference data 128, the display policy 126, the context of the user or wearable computing device 102, and/or other characteristics or parameters. For example, in some embodiments, the display policy 126 may indicate that it is unsafe to display a graphical element on the graphical user interface at any point in time in which the user is traveling above a threshold speed (e.g., determined based on the activity sensors 134) and thereby restrict displaying of or minimize the graphical element during those times. The user may, additionally or alternatively, establish such a preference in the preference data 128. In other words, in order to determine whether display of the graphical element is authorized, the wearable computing device 102 compares the context data to the display policy 126 and/or the preference data 128 to determine the occurrence of an established condition and identify the scope of restriction. It should be appreciated that the graphical element may be unauthorized for display based on any established condition depending on the particular embodiment. In other embodiments, display of the graphical element may be authorized generally but restricted to one or more portions of the display 122 (e.g., in the periphery).

If the wearable computing device 102 determines the graphical element is unauthorized for display at that time, the method 300 returns to block 302 in which the wearable computing device 102 determines whether to display another (or the same) graphical element. As such, in the sensors 130 of the wearable computing device 102. As discussed above, the sensor data may include data sensed or otherwise generated by eye tracking sensors 132, activity sensors 134, inertial sensors 136, location sensors 138, audio sensors 140, biological sensors 142, and/or other sensors. In some embodiments, the wearable computing device 102 may also receive sensor data from remote computing device (e.g., other wearable computing devices in the vicinity).

Figure 4:
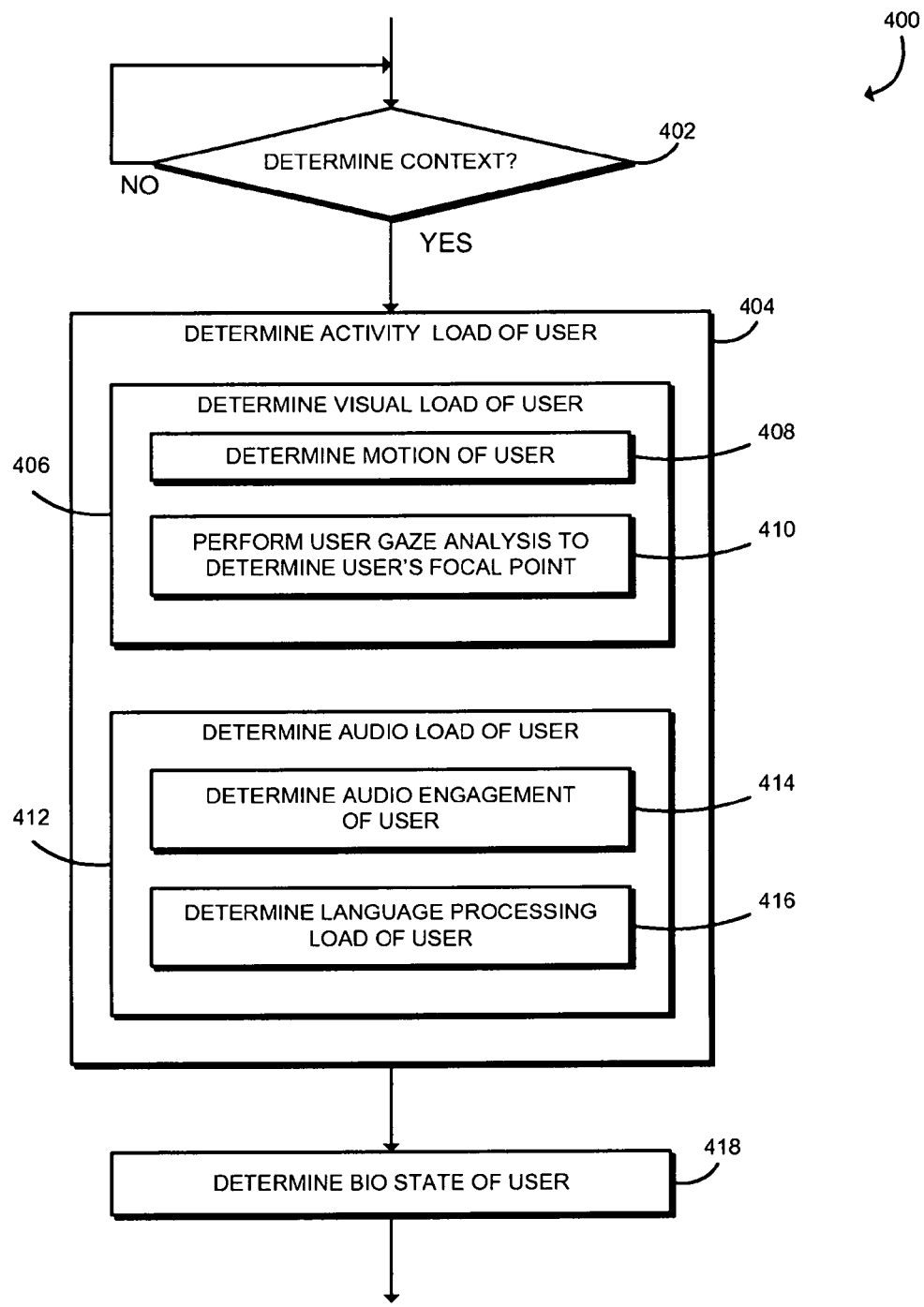
FIG. 4 is a simplified flow diagram of at least one embodiment of a method for determining a context of a user of the wearable computing device of FIG. 1.
Figure 5:
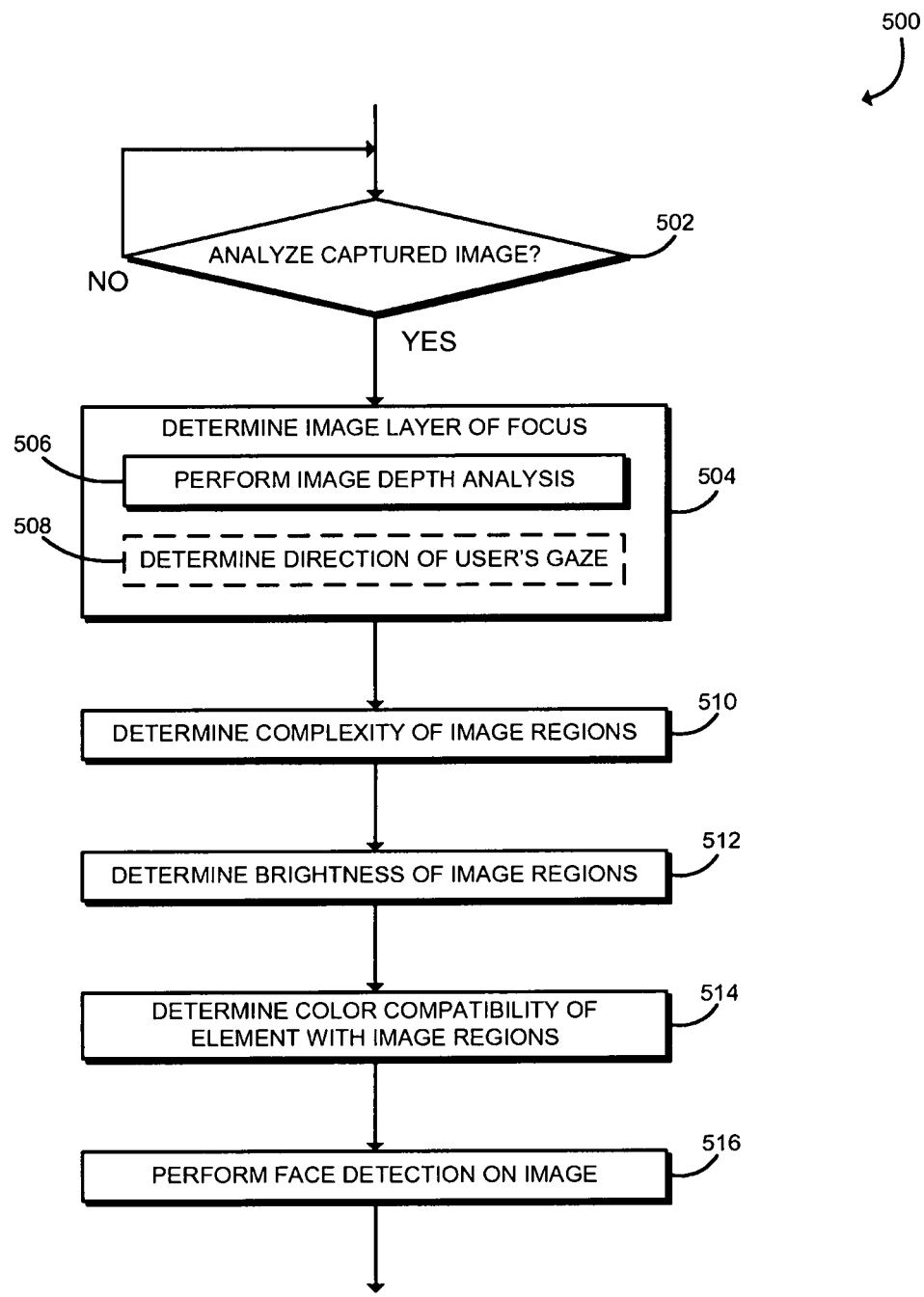
FIG. 5 is a simplified flow diagram of at least one embodiment of a method for analyzing images captured by a camera of the wearable computing device of FIG. 1.

In block 308, the wearable computing device 102 determines the context of the user and/or of the wearable computing device 102 based on the received sensor data. To do so, the wearable computing device 102 may execute a method 400 for determining a context of a user of the wearable computing device 102 as shown in FIG. 4. The illustrative method 400 begins with block 402 in which the wearable computing device 102 determines whether to determine the context of the user. If so, the wearable computing device 102 determines the activity load of the user in block 404 and generates corresponding context data. In doing so, in the illustrative embodiment, the wearable computing device 102 determines the visual load of the user in block 406 and the audio load of the user in block 412.

In determining the visual load of the user in block 406, the wearable computing device 102 determines the motion characteristics of the user in block 408. More specifically, the wearable computing device 102 analyzes the sensor data received from the activity sensors 134 to determine whether the user is, for example, walking, running, sedentary, operating a vehicle, or performing some other identifiable task. As discussed herein, based on that information, the wearable computing device 102 may generate corresponding context data that may be used to indicate whether it is safe to display a graphical element and, if so, what location on the graphical user interface would be most appropriate (e.g., safest) for its display. In block 410, the wearable computing device 102 performs user gaze analysis to determine the user's focal point. As discussed above, the wearable computing device 102 may utilize various eye tracking mechanisms to determine the point in the captured images at which the user is looking and generate corresponding context data.

In determining the audio load of the user in block 412, the wearable computing device 102 determines the audio engagement of the user in block 414. In some embodiments, the wearable computing device 102 may utilize audio and speech recognition, audio segmentation, and audio authentication techniques and mechanisms to determine the audio environment and conversational engagement of the user. For example, the wearable computing device 102 may determine who is talking within the vicinity of the user, the level of engagement the user has with those talking, and/or other audio characteristics. It should be appreciated that a user typically has both a high visual load and a high language processing load while engaged in a some embodiments, the wearable computing device 102 may wait until display of the graphical element is authorized. If, in block 310, the wearable computing device 102 determines display of the graphical element is authorized, the wearable computing device 102 determines the appropriate display location based on image analysis, context, preference data 128, and/or the display policy 126 in block 312. In doing so, the wearable computing device 102 retrieves the context data, preference data 128, and/or the display policy 126 in block 314. As discussed above, the display policy 126 and the preference data 128 may be stored and retrieved from the data storage 124 of the wearable computing device 102. The context data may similarly be stored in the data storage 124 or generated/retrieved based on the sensor data.

In block 316, the wearable computing device 102 analyzes the captured image to generate location metric data. To do so, the wearable computing device 102 may execute a method 500 for analyzing images captured by the camera 120 of the wearable computing device 102. The illustrative method 500 begins with block 502 in which the wearable computing device 102 determines whether to analyze the captured image. If so, in block 504 of the illustrative embodiment, the wearable computing device 102 determines the image layer of focus. That is, as discussed above, the wearable computing device 102 determines whether the user is focusing on or looking at the foreground or background layer of the captured image/scene. In embodiments in which there are multiple foreground and/or background sections, the wearable computing device 102 may identify the particular section of the layer at which the user is looking. In doing so, the wearable computing device 102 performs a depth analysis on the captured image in block 506. Additionally, in some embodiments, the wearable computing device 102 performs gaze tracking to determine the direction of the user's gaze in block 508.

In block 510, the wearable computing device 102 determines the complexity of various image regions (i.e., prospective graphical element locations). As discussed above, the wearable computing device 102 may use, for example, a windowing method to determine the entropy or complexity of each prospective location of the graphical user interface at which to place the graphical element. In block 512, the wearable computing device 102 determines the brightness of each image region (e.g., based on light intensity values of image pixels within the region) and, in block 514, determines the color compatibility of the graphical element with each of the image regions (e.g., based on comparing a histogram of the image regions to a histogram of the graphical element). Additionally, in block 516, the wearable computing device 102 performs face detection on the captured image to identify the locations of any faces within the image as discussed above. It should be appreciated that, in each of blocks 504, 510, 512, 516, and 516, the wearable computing device 102 generates location metric data, which indicates the relative suitability of each prospective location of the graphical element with regard to that particular analytical metric.

Referring back to FIG. 3, in block 318 of the illustrative embodiment, the wearable computing device 102 applies weights to the analytical and/or contextual metrics to determine appropriateness data for each prospective display location, which is indicative of the relative suitability of the corresponding prospective location as discussed above. For example, the wearable computing device 102 may assign a coefficient to each metric (e.g., based on its importance to determining the location of the graphical element) and calculate a weighted sum of those metrics for each prospective location of the graphical element on the user interface. As discussed above, in some embodiments, the wearable computing device 102 may normalize each of the metrics (e.g., to have values between zero and one) prior to applying the weights and summing the values. In other embodiments, the wearable computing device 102 may use other algorithms to determine the appropriateness of prospective locations for the graphical element and generate the appropriateness data. The wearable computing device 102 may compare the appropriateness data associated with each prospective location to determine a suitable location for displaying the graphical element on the graphical user interface. In block 320, the wearable computing device 102 displays the graphical element on the graphical user interface at the selected location.

Referring now to FIGS. 6-9, prospective locations for the placement of graphical elements on a graphical user interface over the same field of view (i.e., scene) visible to the user are illustratively shown. In each of the graphical user interfaces 600, 700, 800, 900, a scene 602 is shown including two persons (a man and a woman) and a dining set (i.e., a table and chair) in a fairly empty room. It should be appreciated that the graphical elements 604, 704, 804, 904 are shown as opaque in the illustrative embodiments for clarity but, as discussed above, may be transparent or semi-transparent in other embodiments. As discussed above, the wearable computing device 102 analyzes the scene 602, context data, user preference data 128, and the display policy 126 to determine an appropriate location for the placement of graphical elements. The prospective locations shown in FIGS. 6-9 may not be appropriate display locations based on such analyses and data but are presented for purposes of discussion.

Figure 6:
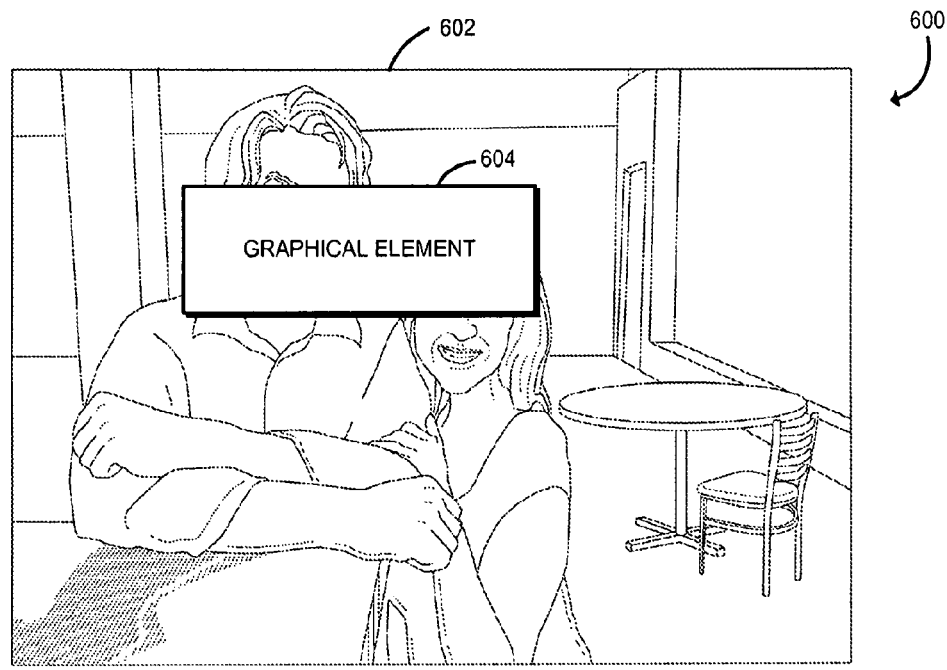
FIGS. 6-9 are simplified diagrams illustrating prospective placements of graphical elements on a graphical user interface by the wearable computing device of FIG. 1.

Referring now specifically to FIG. 6, the graphical element 604 is shown as overlain on both persons' faces. A graphical element displayed at that location would ordinarily be inappropriate as it would be placed on both the foreground and over a person's face. However, if the wearable computing device 102 determined that the user was ignoring the audio from both the man and woman and/or looking at the table in the background, it may be an acceptable location. As discussed above, the determination of the appropriateness of the display location is based on the image analysis, context, preference data, and/or policy data. As such, a particular location may be appropriate under certain circumstances (e.g., the user is focusing on the table in FIG. 6) and inappropriate under other circumstances (e.g., the user is focusing on the two persons).

Figure 7:
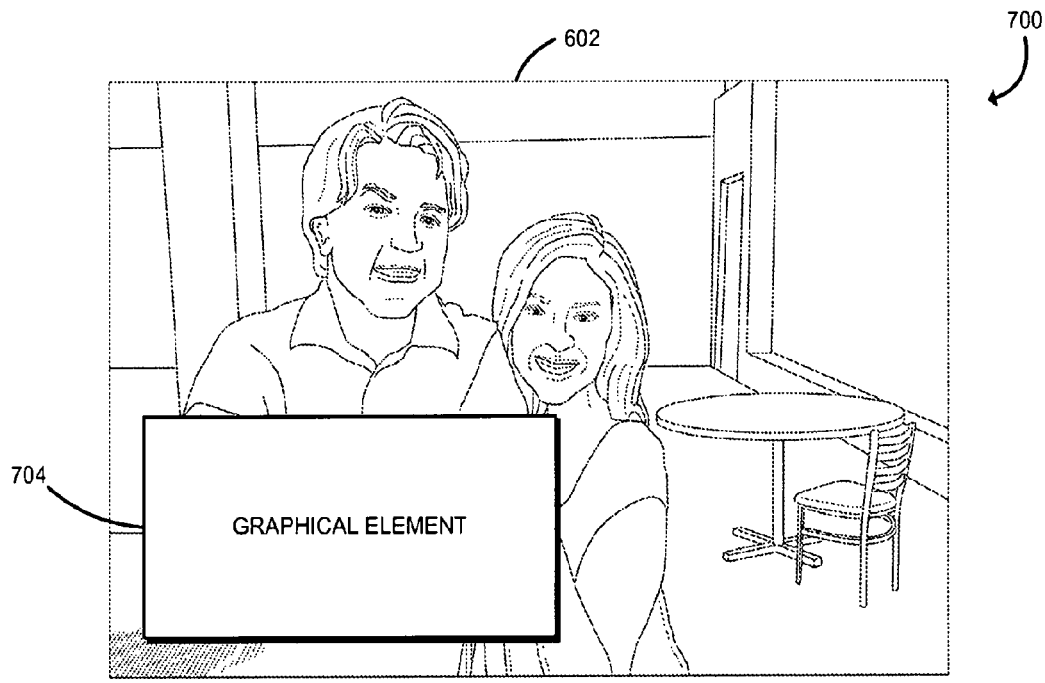
Figure 8:
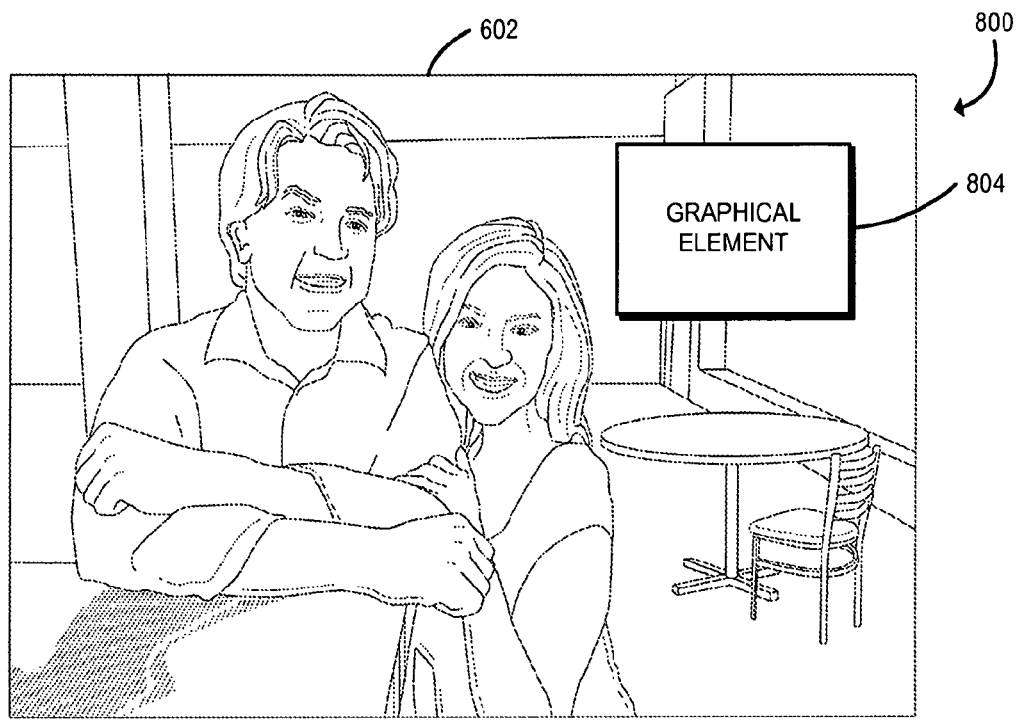
Figure 9:
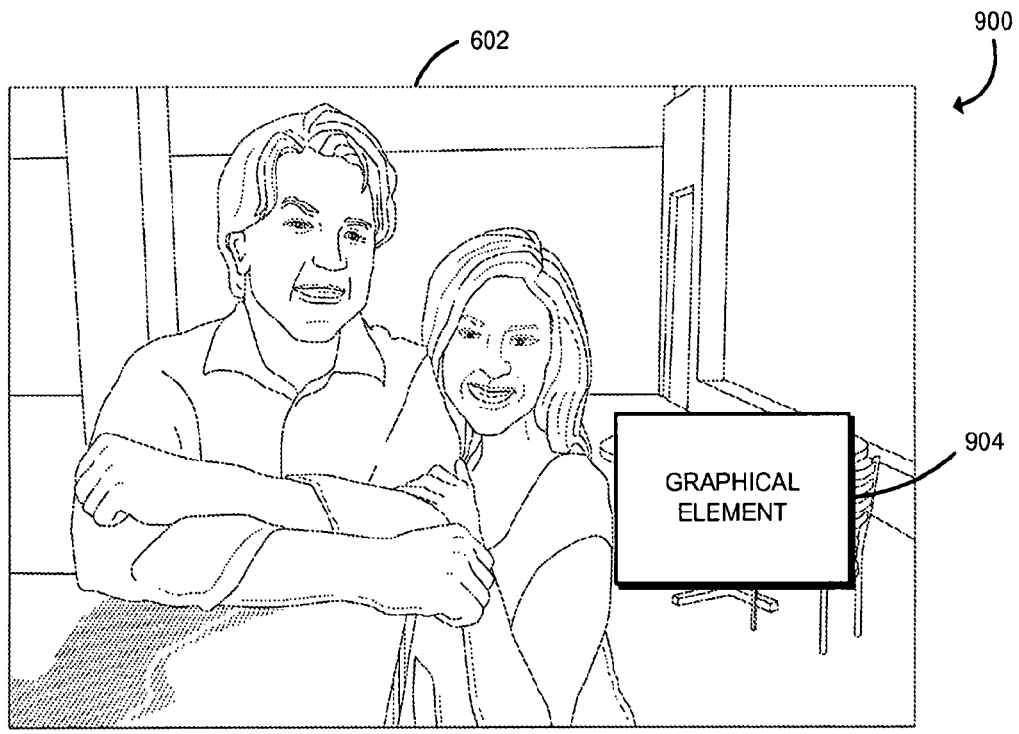

Referring now to FIG. 7, the graphical element 704 is shown covering the hands of both persons in the scene 602. Although this prospective location is generally more acceptable than the prospective location of the graphical element 604 (see FIG. 6), the graphical element 704 still causes a foreground conflict. As such, the user of the wearable computing device 102 may not be able to see or interpret any hand gestures of the persons in the scene 602. Referring now to FIG. 8, the graphical element 804 is shown as covering only the wall of the room in the background of the scene 602. The prospective location shown for graphical element 804 is likely to be the most suitable location for the graphical element 804 in most circumstances. However, if a window was located along the wall, that may not be the case as the light entering through the window could cause potential issues due to high relative brightness. Referring now to FIG. 9, the graphical element 904 is shown over the table and chair set in the background of the scene 602. Because this location is in the background of the captured image, it may be acceptable. However, there may be a high level of entropy associated with the complexity of the table and chair legs that may make reading text difficult. Additionally, such a location may be inappropriate if the user is focusing on the table rather than the man and woman in the scene 602. In the illustrative scene 602, the wearable computing device 102 balances these conflicts to determine an appropriate display location for a graphical element based on the various metrics as discussed above.

EXAMPLES

Illustrative examples of the technologies disclosed herein are provided below. An embodiment of the technologies may include any one or more, and any combination of, the examples described below.

Example 1 includes a wearable computing device for displaying a graphical user interface, the wearable computing device comprising a camera to generate a captured image; an image analysis module to analyze the captured image to generate image location metric data for one or more prospective locations on the graphical user interface at which to place a graphical element, the image location metric data indicative of one or more image characteristics of the corresponding prospective location; and a placement module to (i) determine appropriateness data for each prospective location based on the corresponding image location metric data, the appropriateness data indicative of a relative suitability of the corresponding location for display of the graphical element; (ii) select one of the prospective locations based on the appropriateness data; and (iii) display the graphical element on the graphical user interface at the selected prospective location.

Example 2 includes the subject matter of Example 1, and wherein the captured image includes scenery within a field of view of a user of the wearable computing device.

Example 3 includes the subject matter of any of Examples 1 and 2, and wherein to analyze the captured image comprises to determine a complexity of the captured image at the one or more prospective locations, wherein to determine the appropriateness data for each prospective location comprises to determine the appropriateness data for each prospective location based on the complexity of the captured image at the one or more prospective locations.

Example 4 includes the subject matter of any of Examples 1-3, and wherein to determine the complexity comprises to determine an entropy score of the captured image at the one or more prospective locations.

Example 5 includes the subject matter of any of Examples 1-4, and wherein to analyze the captured image comprises to determine color characteristics of the captured image at the one or more prospective locations, wherein to determine the appropriateness data for each prospective location comprises to determine the appropriateness data for each prospective location based on the color characteristics of the captured image at the one or more prospective locations.

Example 6 includes the subject matter of any of Examples 1-5, and wherein to determine the color characteristics of the captured image at the one or more prospective locations comprises to generate a reference representation of frequencies of light present in pixels of the graphical element; generate a representation of frequencies of light present in pixels of each of the prospective locations of the captured image; and compare the representation of frequency of light present in pixels of each of the prospective locations of the captured image to the reference representation.

Example 7 includes the subject matter of any of Examples 1-6, and wherein to analyze the captured image comprises to determine a light intensity of the captured image at the one or more prospective locations, wherein to determine the appropriateness data for each prospective location comprises to determine the appropriateness data for each prospective location based on the light intensity of the captured image at the one or more prospective locations.

Example 8 includes the subject matter of any of Examples 1-7, and wherein to analyze the captured image comprises to apply a face detection algorithm to the captured image to determine a location of any persons' faces in the captured image, wherein to determine the appropriateness data for each prospective location comprises to determine the appropriateness data for each prospective location based on the location of each person's face identified in the captured image.

Example 9 includes the subject matter of any of Examples 1-8, and further including a depth analysis module to (i) generate a depth map based on the captured image, (ii) determine a foreground layer and a background layer of the captured image based on the generated depth map, and (iii) identify an image layer of focus based on a gaze direction of a user of the wearable computing device, wherein to determine the appropriateness data for each prospective location comprises to determine the appropriateness data for each prospective location based on the corresponding image location metric data and the image layer of focus.

Example 10 includes the subject matter of any of Examples 1-9, and further including a sensor processing module to determine a context of a user of the wearable computing device based on data from one or more sensors of the wearable computing device.

Example 11 includes the subject matter of any of Examples 1-10, and wherein to determine the context of the user comprises to determine one or more of a visual load of the user, an audio load of the user, or a biological state of the user.

Example 12 includes the subject matter of any of Examples 1-11, and wherein to determine the appropriateness data for each prospective location comprises to determine appropriateness data for each prospective location based on the corresponding image location metric data and the context of the user.

Example 13 includes the subject matter of any of Examples 1-12, and wherein the placement module is further to determine whether to display the graphical element based on the context data, wherein to determine the appropriateness data comprises to determine appropriateness data in response to a determination to display the graphical element.

Example 14 includes the subject matter of any of Examples 1-13, and wherein to determine the context of the user comprises to determine motion of the user.

Example 15 includes the subject matter of any of Examples 1-14, and wherein the image location metric data comprises a plurality of subcomponents based on corresponding sensor data, and wherein to determine the appropriateness data for each prospective location comprises to apply a weighting algorithm to subcomponents of the image location metric data.

Example 16 includes the subject matter of any of Examples 1-15, and wherein to select one of the prospective locations comprises to select one of the prospective locations based on the appropriateness data and one or more established user preferences.

Example 17 includes the subject matter of any of Examples 1-16, and wherein to analyze the captured image comprises to apply a filter to the captured image, wherein a window of the filter has the same size and shape as the graphical element.

Example 18 includes a method for displaying graphical elements on a graphical user interface by a wearable computing device, the method comprising generating, by a camera of the wearable computing device, a captured image; analyzing, by the wearable computing device, the captured image to generate image location metric data for one or more prospective locations on the graphical user interface at which to place a graphical element, the image location metric data indicating one or more image characteristics of the corresponding prospective location; determining, by the wearable computing device, appropriateness data for each prospective location based on the corresponding image location metric data, the appropriateness data indicating a relative suitability of the corresponding location for display of the graphical element; selecting, by the wearable computing device, one of the prospective locations based on the appropriateness data; and displaying, by the wearable computing device, the graphical element on the graphical user interface at the selected prospective location.

Example 19 includes the subject matter of Example 18, and wherein generating the captured image comprises generating a captured image including scenery within a field of view of a user of the wearable computing device.

Example 20 includes the subject matter of any of Examples 18 and 19, and wherein analyzing the captured image comprises determining a complexity of the captured image at the one or more prospective locations, wherein determining the appropriateness data for each prospective location comprises determining the appropriateness data for each prospective location based on the complexity of the captured image at the one or more prospective locations.

Example 21 includes the subject matter of any of Examples 18-20, and wherein determining the complexity comprises determining an entropy score of the captured image at the one or more prospective locations.

Example 22 includes the subject matter of any of Examples 18-21, and wherein analyzing the captured image comprises determining color characteristics of the captured image at the one or more prospective locations, wherein determining the appropriateness data for each prospective location comprises determining the appropriateness data for each prospective location based on the color characteristics of the captured image at the one or more prospective locations.

Example 23 includes the subject matter of any of Examples 18-22, and wherein determining the color characteristics of the captured image at the one or more prospective locations comprises generating a reference representation of frequencies of light present in pixels of the graphical element; generating a representation of frequencies of light present in pixels of each of the prospective locations of the captured image; and comparing the representation of frequency of light present in pixels of each of the prospective locations of the captured image to the reference representation.

Example 24 includes the subject matter of any of Examples 18-23, and wherein analyzing the captured image comprises determining a light intensity of the captured image at the one or more prospective locations, wherein determining the appropriateness data for each prospective location comprises determining the appropriateness data for each prospective location based on the light intensity of the captured image at the one or more prospective locations.

Example 25 includes the subject matter of any of Examples 18-24, and wherein analyzing the captured image comprises applying a face detection algorithm to the captured image to determine a location of any persons' faces in the captured image, wherein determining the appropriateness data for each prospective location comprises determining the appropriateness data for each prospective location based on the location of each person's face identified in the captured image.

Example 26 includes the subject matter of any of Examples 18-25, and further including generating, by the wearable computing device, a depth map based on the captured image determining, by the wearable computing device, a foreground layer and a background layer of the captured image based on the generated depth map; and identifying, by the wearable computing device, an image layer of focus based on a gaze direction of a user of the wearable computing device, wherein determining the appropriateness data for each prospective location comprises determining the appropriateness data for each prospective location based on the corresponding image location metric data and the image layer of focus.

Example 27 includes the subject matter of any of Examples 18-26, and further including determining, by the wearable computing device, a context of a user of the wearable computing device based on data from one or more sensors of the wearable computing device.

Example 28 includes the subject matter of any of Examples 18-27, and wherein determining the context of the user comprises determining one or more of: a visual load of the user, an audio load of the user, or a biological state of the user.

Example 29 includes the subject matter of any of Examples 18-28, and wherein determining the appropriateness data for each prospective location comprises determining appropriateness data for each prospective location based on the corresponding image location metric data and the context of the user.

Example 30 includes the subject matter of any of Examples 18-29, and further including determining, by the wearable computing device, whether to display the graphical element based on the context data, wherein determining the appropriateness data comprises determining appropriateness data in response to determining to display the graphical element.

Example 31 includes the subject matter of any of Examples 18-30, and wherein determining the context of the user comprises determining motion of the user.

Example 32 includes the subject matter of any of Examples 18-31, and wherein the image location metric data comprises a plurality of subcomponents based on corresponding sensor data, and wherein determining the appropriateness data for each prospective location comprises applying a weighting algorithm to subcomponents of the image location metric data.

Example 33 includes the subject matter of any of Examples 18-32, and wherein selecting one of the prospective locations comprises selecting one of the prospective locations based on the appropriateness data and one or more established user preferences.

Example 34 includes the subject matter of any of Examples 18-33, and wherein analyzing the captured image comprises applying a filter to the captured image, the filter having a window with the same size and shape as the graphical element.

Example 35 includes a wearable computing device comprising a processor; and a memory having stored therein a plurality of instructions that when executed by the processor cause the wearable computing device to perform the method of any of Examples 18-34.

Example 36 includes one or more machine-readable storage media comprising a plurality of instructions stored thereon that, in response to being executed, result in a wearable computing device performing the method of any of Examples 18-34.

Example 37 includes a wearable computing device for displaying graphical elements on a graphical user interface, the wearable computing device comprising means for performing the method of any of Examples 18-34.

The invention claimed is:

1. A wearable computing device for displaying a graphical user interface, the wearable computing device comprising:
a camera to generate a captured image;
an image analysis module to analyze a plurality of prospective locations of the captured image at which a graphical element can be placed to generate image location metric data for each prospective location of the captured image, the image location metric data indicative of one or more image characteristics of the corresponding prospective location, wherein to analyze the captured image comprises to apply a filter to the captured image, wherein a window of the filter has the same size and shape as the graphical element; and
a placement module to (i) determine appropriateness data for each prospective location based on the corresponding image location metric data, the appropriateness data indicative of a relative suitability of the corresponding location for display of the graphical element; (ii) select one of the prospective locations based on the appropriateness data; and (iii) display the graphical element on the graphical user interface at the selected prospective location.

2. The wearable computing device of claim 1, wherein the captured image includes scenery within a field of view of a user of the wearable computing device.

3. The wearable computing device of claim 1, wherein to analyze the captured image comprises to determine a complexity of the captured image at the prospective locations,
wherein to determine the appropriateness data for each prospective location comprises to determine the appropriateness data for each prospective location based on the complexity of the captured image at the prospective locations.

4. The wearable computing device of claim 3, wherein to determine the complexity comprises to determine an entropy score of the captured image at the prospective locations.

5. The wearable computing device of claim 1, wherein to analyze the captured image comprises to determine color characteristics of the captured image at the prospective locations,
wherein to determine the appropriateness data for each prospective location comprises to determine the appropriateness data for each prospective location based on the color characteristics of the captured image at the prospective locations.

6. The wearable computing device of claim 5, wherein to determine the color characteristics of the captured image at the prospective locations comprises to:
generate a reference representation of frequencies of light present in pixels of the graphical element;
generate a representation of frequencies of light present in pixels of each of the prospective locations of the captured image; and
compare the representation of frequency of light present in pixels of each of the prospective locations of the captured image to the reference representation.

7. The wearable computing device of any one of claim 1, wherein to analyze the captured image comprises to determine a light intensity of the captured image at the prospective locations,
wherein to determine the appropriateness data for each prospective location comprises to determine the appropriateness data for each prospective location based on the light intensity of the captured image at the prospective locations.

8. The wearable computing device of any one of claim 1, wherein to analyze the captured image comprises to apply a face detection algorithm to the captured image to determine a location of any persons' faces in the captured image,
wherein to determine the appropriateness data for each prospective location comprises to determine the appropriateness data for each prospective location based on the location of each person's face identified in the captured image.

9. The wearable computing device of any one of claim 1, further comprising a depth analysis module to (i) generate a depth map based on the captured image, (ii) determine a foreground layer and a background layer of the captured image based on the generated depth map, and (iii) identify an image layer of focus based on a gaze direction of a user of the wearable computing device,
wherein to determine the appropriateness data for each prospective location comprises to determine the appropriateness data for each prospective location based on the corresponding image location metric data and the image layer of focus.

10. The wearable computing device of claim 1, further comprising a sensor processing module to determine a context of a user of the wearable computing device based on data from one or more sensors of the wearable computing device,
wherein to determine the appropriateness data for each prospective location comprises to determine appropriateness data for each prospective location based on the corresponding image location metric data and the context of the user.

11. The wearable computing device of claim 10, wherein to determine the context of the user comprises to determine one or more of: a visual load of the user, an audio load of the user, or a biological state of the user.

12. The wearable computing device of claim 10, wherein the placement module is further to determine whether to display the graphical element based on the context data, wherein to determine the appropriateness data comprises to determine appropriateness data in response to a determination to display the graphical element.

13. The wearable computing device of any one of claim 1, wherein the image location metric data comprises a plurality of subcomponents based on corresponding sensor data, and
wherein to determine the appropriateness data for each prospective location comprises to apply a weighting algorithm to subcomponents of the image location metric data.

14. The wearable computing device of any one of claim 1, wherein to select one of the prospective locations comprises to select one of the prospective locations based on the appropriateness data and one or more established user preferences.

15. One or more machine-readable storage media comprising a plurality of instructions stored thereon that, in response to execution, cause a wearable computing device to:
generate, by a camera of the wearable computing device, a captured image;
analyze, by the wearable computing device, a plurality of prospective locations of the captured image at which a graphical element can be placed to generate image location metric data for each prospective location of the captured image, the image location metric data indicative of one or more image characteristics of the corresponding prospective location, wherein to analyze the captured image comprises to apply a filter to the captured image, the filter having a window with the same size and shape as the graphical element;
determine, by the wearable computing device, appropriateness data for each prospective location based on the corresponding image location metric data, the appropriateness data indicative of a relative suitability of the corresponding location for display of the graphical element;
select, by the wearable computing device, one of the prospective locations based on the appropriateness data; and
display, by the wearable computing device, the graphical element on the graphical user interface at the selected prospective location.

16. The one or more machine-readable storage media of claim 15, wherein to analyze the captured image comprises to:
determine a complexity of the captured image at the prospective locations;
determine color characteristics of the captured image at the prospective locations; and
determine a light intensity of the captured image at the prospective locations,
wherein to determine the appropriateness data for each prospective location comprises to determine the appropriateness data for each prospective location based on the complexity, the color characteristics, and the light intensity of the captured image at the prospective locations.

17. The one or more machine-readable storage media of claim 16, wherein to determine the color characteristics of the captured image at the prospective locations comprises to:
generate a reference representation of frequencies of light present in pixels of the graphical element;
generate a representation of frequencies of light present in pixels of each of the prospective locations of the captured image; and
compare the representation of frequency of light present in pixels of each of the prospective locations of the captured image to the reference representation.

18. The one or more machine-readable storage media of claim 15, wherein to analyze the captured image comprises to apply a face detection algorithm to the captured image to determine a location of any persons' faces in the captured image,
wherein to determine the appropriateness data for each prospective location comprises to determine the appropriateness data for each prospective location based on the location of each person's face identified in the captured image.

19. The one or more machine-readable storage media of claim 15, wherein the plurality of instructions further cause the wearable computing device to:
generate a depth map based on the captured image;
determine a foreground layer and a background layer of the captured image based on the generated depth map; and
identify an image layer of focus based on a gaze direction of a user of the wearable computing device,
wherein to determine the appropriateness data for each prospective location comprises to determine the appropriateness data for each prospective location based on the corresponding image location metric data and the image layer of focus.

20. The one or more machine-readable storage media of claim 15, wherein the plurality of instructions further cause the wearable computing device to determine a context of a user of the wearable computing device based on data from one or more sensors of the wearable computing device,
wherein to determine the appropriateness data for each prospective location comprises to determine appropriateness data for each prospective location based on the corresponding image location metric data and the context of the user.

21. The one or more machine-readable storage media of claim 15, wherein the image location metric data comprises a plurality of subcomponents based on corresponding sensor data, and
wherein to determine the appropriateness data for each prospective location comprises to apply a weighting algorithm to subcomponents of the image location metric data.

22. A method for displaying graphical elements on a graphical user interface by a wearable computing device, the method comprising:

generating, by a camera of the wearable computing device, a captured image;

analyzing, by the wearable computing device, a plurality of prospective locations of the captured image at which a graphical element can be placed to generate image location metric data for each prospective location of the captured image, the image location metric data indicative of one or more image characteristics of the corresponding prospective location, wherein analyzing the captured image comprises applying a filter to the captured image, the filter having a window with the same size and shape as the graphical element;

determining, by the wearable computing device, appropriateness data for each prospective location based on the corresponding image location metric data, the appropriateness data indicating a relative suitability of the corresponding location for display of the graphical element;

selecting, by the wearable computing device, one of the prospective locations based on the appropriateness data; and displaying, by the wearable computing device, the graphical element on the graphical user interface at the selected prospective location.

23. The method of claim 22, further comprising determining, by the wearable computing device, a context of a user of the wearable computing device based on data from one or more sensors of the wearable computing device, wherein analyzing the captured image comprises:

determining a complexity of the captured image at the prospective locations;

determining color characteristics of the captured image at the prospective locations;

determining a light intensity of the captured image at the one or morn prospective locations; and applying a face detection algorithm to the captured image to determine a location of any persons' faces in the captured image; and wherein determining the appropriateness data for each prospective location comprises determining the appropriateness data for each prospective location based on (i) the complexity, the color characteristics, and the light intensity of the captured image at the prospective locations, (ii) the location of each person's face identified in the captured image, and (iii) the context of the user.

* * * * *